Jan. 27, 1953 C. E. MANNING ET AL 2,626,651
SWAB FOR TIRE ASSEMBLY MACHINES
Filed June 5, 1950
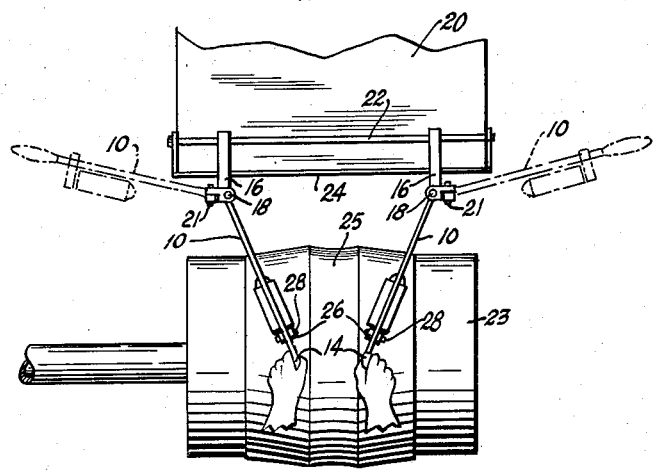
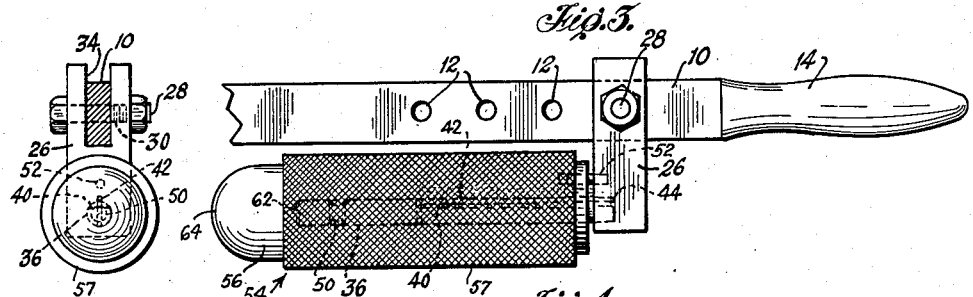
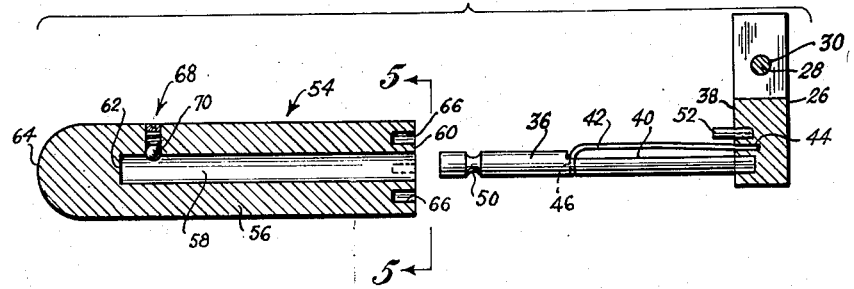
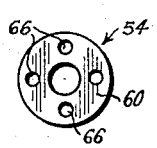
Inventor
Charles E. Manning
and
Gerald E. Walch
Ely & Frye
Attorney Patented Jan. 27, 1953

2,626,651

UNITED STATES PATENT OFFICE 2,626,651

SWAB FOR TIRE ASSEMBLY MACHINES

Charles E. Manning, Birdsboro, and Gerald E. Walch, Pottstown, Pa., assignors to The Firestone Tire & Rubber Company, Akron, Ohio, a corporation of Ohio Application June 5, 1950, Serial No. 166,246

5 Claims. (Cl. 154—9)

The primary object of the invention resides in the provision of an improved swab of the type employed in connection with tire assembly machines for the purpose of exerting pressure on the tread stock during a tire assembling operation.

More specifically the object of the invention is to provide a readily detachable swab which may be replaced in a fraction of the time heretofore required for changeover.

A further object is generally to improve and simplify the construction of tire building machine swabs and the manner in which they are mounted upon swab arms while obtaining increased efficiency of operation and substantial reduction of the time required for replacement of a worn swab with a new or recovered unit.

Other objects and advantages will become apparent to persons skilled in the art upon examination of the drawings, specification, and appended claims.

In the drawings, in which like parts are identified by the same reference numerals, Fig. 1 illustrates in plan, a pair of swab arms, pivotally attached to a tire building machine, fragmentarily illustrated, to extend over a tire building drum;

Fig. 2 is an end elevational view of the device shown in Fig. 3;

Fig. 3 is a side elevation view illustrating a portion of a swab arm of a conventional type, provided with a depending detachable swab incorporating the present invention;

Fig. 4 is an exploded view of the lower parts of Fig. 3, with the covering of the swab unit removed, the parts being shown in axial section; and Fig. 5 is an end elevation taken along line 5—5, Fig. 4.

The art of tire building by the so-called drum method is well known, and the employment, in connection with tire building machines, of pivotally attached swab arms carrying depending swabs and operating as a second-class lever for the purpose of smoothing and compressing, by a laterally directed arcuate movement, the tread stock applied at various stages during assembly of a drum type "green" tire, is considered standard procedure.

Heretofore it has been considered standard practice to attach swabs to the swab arms by means of a pair of depending brackets between which a supporting arm is fastened. At least one of the depending brackets was bolted to the arm and replacement of the swab necessitated complete removal of one arm and removal of the swab for a recovering operation. A removal operation required tools and considerable time on the part of the tire builder with consequent loss of productive capacity. The present invention permits rapid repositioning or removal of the swab without tools and with a minimum loss time.

As best shown in Fig. 3, a pair of swab arms, 10, which may be of the conventional type, are provided with a plurality of bores, 12, equally spaced along a portion of the arm adjacent the unpivoted ends thereof which preferably define a handle, 14. The opposite ends of the arms, as shown in Fig. 1, are pivoted to brackets 16, as by pintle bolts 18. Brackets 16 provide support of the identical arms 10 as shown, and are suitably mounted to a tire building machine, fragmentarily shown at 20, by a rod 22. Brackets 16 preferably rest on a straight edge support 24, and are provided with suitable means, not shown, for adjustment along the length of rod 22. Arms 10 are pivoted at 21 to bracket 16 for movement in a vertical plane. Arms 10 are swingable from the dotted position shown to the operating position shown in heavy lines, above a tire building drum 23, on which the tread stock of a tire is illustrated at 25.

Returning to Fig. 3, a depending arm 26 may be clamped by bolt 28 which extends through one of the bores 12, and through a suitable bore 30, provided in arm 26, for that purpose. Arm 26 has its upper end portion bifurcated as shown in Fig. 2 to provide a slot 34, for the snug reception of arm 10. A mounting spindle 36, has one end secured to the lower end of arm 26, preferably in pressed fit engagement therewith, to project in right angular relation to the inner side wall 38, of arm 26, in parallel relation to the axis of arm 10. A portion of spindle 36 extending outwardly from arm 26 is flattened at 40 for the reception with a wire-like element 42, which has one end 44, in pressed fit engagement within a suitable bore provided in side 38 of arm 26 in vertical alignment with the axis of spindle 36. Spindle 36 is provided with a transverse bore, 46, for the reception of the other end of element 42 which is downwardly arced as shown to enter bore 46. The function of wire-like element 42 is to insure snug engagement between a removably mounted swab, later described, and spindle 36. The free end of spindle 36 is provided with an annular groove, 50, spaced from the terminus thereof as shown for the reception of detent pin, later described. A locking pin, 52, is secured to arm 26, preferably by pressed fit engagement, to extend therefrom in a plane vertical to the axis of spindle 36.

A detachable swab unit, best shown in Fig. 3, generically designated 54, includes a generally cylindrical base member 56, best shown in Fig. 4, provided with center bore 58, extending from a planate end thereof 60, to terminate at 62, short of a solid end 64, which may be finished in a hemispherical manner as shown. Suitable covering material 57 is mounted on member 56, the material being of a type to offer substantial resistance to wear while being water absorbent, since it is usual practice to maintain the covering material wet during use. A plurality of bores 66, four being shown, extend a short distance inwardly from the planiform end of base 60, in radially spaced relation to center bore 58, for locking engagement with pin 52 in one of the several positions determined by the number of bores provided.

A spring biased ball type detent assembly 68 is disposed within a radial bore 70 which extends through a wall of base member 56 at a suitable distance from the ends 62 of bore 58 for registered engagement with the annular groove 50 of spindle 36.

As is readily apparent from the above description, mounting of swab unit 54 from the unassembled portion shown in Fig. 4 may be effected by slipping base member 56 over spindle 36 with consequent distortion of spring element 42 and in engagement, when fully mounted between the ball of detent assembly 68 and the annular groove 50 of spindle 36 to lock the swab assembly against axial displacement along spindle 36. Removal of unit 54 is effected by pulling the swab unit outwardly from spindle 36 with sufficient force to overcome the constraining effect of detent assembly 68. The swab unit may thus be rapidly repositioned on the spindle to allow maximum service therefrom prior to re-covering, since it is obvious that the work contacting surface thereof will become worn during use while the remainder of the covering, being unworn, may be utilized by rotationally repositioning the swab unit.

It is common practice for the operator of the tire building machine to keep a supply of swabs on hand to allow periodical change, the used swabs being re-covered as necessary. The improved swab mounting above described greatly increases the usable life of each swab while substantially reducing the time previously required for interchange.

What is claimed is:

1. In a swab unit for tire building machine, a lever arm, a depending arm fixed to said lever arm, a spindle fixed to said depending arm to extend therefrom in parallel spaced relation to said lever arm, a swab assembly including a cylindrical element of rigid material provided with a center bore for removable mounting on said spindle, and detent means cooperatively associating between said rigid member and said spindle to maintain said member on said spindle during use.

2. In a swab unit for tire building machines, in combination with an elongated member having one end thereof adapted for universal engagement with a support, the opposite end thereof being adapted for manual manipulation into engagement with work material mounted on a drum for rotation therewith, said elongated member being provided, near the unpivoted end thereof, with a laterally projecting support member; the improvement comprising means for the removable mounting of a rigidly supported swab unit on said laterally extending support member in parallel spaced relation to said elongated member, said means comprising a spindle fixed to said support member to project therefrom in parallel spaced relation to the axis of said elongated member, a rigid member provided with a bore for the mounting of said rigid member on said spindle, means restraining said rigid member against rotation in respect to said spindle, and a fabric-like covering positioned on said rigid member and fixed against relative movement in respect thereto.

3. A detachable tire building swab unit comprising a lever arm carrying a spindle arranged parallel to said arm and in offset relation thereto, a rigid member of general cylindrical configuration provided along at least a portion of the axis thereof with a center bore for the reception of said rigid member on said spindle, spring biased means associated with said spindle and adapted to engage the surface defining said center bore to effect a pressed engagement therebetween, detent means locking said rigid member on said spindle against axially directed forces of a magnitude initiated during operation of the device, and means to lock said rigid member against rotation in respect to said spindle.

4. A swab unit for tire building machines having in combination, a lever, a spindle, and means for fixedly mounting said spindle below said lever in parallelism with said spindle, a rigid member of cylindrical configuration provided with a center bore for mounting on said spindle, and means to lock said rigid member on said spindle in multiple positions of rotation thereof in respect to said spindle.

5. In a swab unit for tire building machines, a supporting lever, a depending arm fixed to said lever to be supported thereby, a spindle fixed to said arm to extend laterally thereof in parallel spaced relation to the axis of said lever, a pin fixed to said arm and radially positioned in respect to said spindle to extend axially thereof for a portion of the length of said spindle, a portion of said spindle immediately adjacent the arm being flattened, said spindle being provided with a transverse bore adjacent the outer end of said flattened portion, a wire-like spring having one end fixed to said arm, said spring extending axially along said flat portion with its outer end arcuately directed into said transverse bore, said spindle being provided near the outer end thereof with an annular groove for the reception of a detent bore, a cylindrical rigid member provided with a center bore for mounting on said spindle in pressed engagement with said wire-like spring, said member being provided at one end thereof with a plurality of bores disposed in concentric relation to said center bore in position for registry for said pin, said rigid member being provided near the outer end thereof, with a bore positioned for registry with the annular groove when said spindle and said rigid member is fully mounted, and spring biased detent means disposed within said last mentioned bore and including a detent ball biased toward said center bore for engagement with the annular groove on said spindle.

CHARLES E. MANNING.
GERALD E. WALCH.

REFERENCES CITED

The following references are of record in the file of this patent:

UNITED STATES PATENTS

| Number | Name | Date |
| --- | --- | --- |
| 93,429 | French | Aug. 10, 1869 |
| 137,589 | Bailey | Apr. 8, 1873 |
| 831,745 | Rice | Sept. 25, 1906 |
| 1,728,511 | Scrote | Sept. 17, 1929 |
| 1,813,286 | Gewalt | July 7, 1931 |
| 2,161,117 | Wikle | June 6, 1939 |
| 2,162,359 | Rhinevault | June 13, 1939 |
| 2,498,953 | Glynn | Feb. 28, 1950 |